Figure 1:
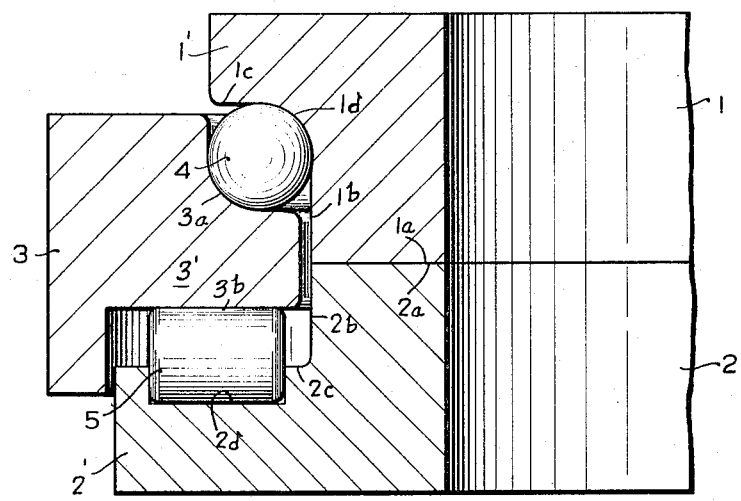

Feb. 7, 1967  W. GROLMAN ET AL  3,302,986
DOUBLE ROW ANTI-FRICTION BEARING
Filed Dec. 8, 1964

INVENTORS
Wilhelm Grolman
Gerd Heimsath by Michael J. Striker

United States Patent Office 3,302,986
Patented Feb. 7, 1967

3,302,986
DOUBLE ROW ANTI-FRICTION BEARING
Wilhelm Grolman, Dortmund-Kirchhorde, and Gerd Heimsath, Dortmund, Germany, assignors to Eisenwerk Rothe Erde G.m.b.H., Dortmund, Germany
Filed Dec. 8, 1964, Ser. No. 416,802
Claims priority, application Germany, Dec. 13, 1963, E 26,021
5 Claims. (Cl. 308—174)

The present invention relates to double row anti-friction bearings for taking up radial and axial thrusts, and more specifically to a double row anti-friction bearing in which at least one row of rolling elements is constituted by rollers.

The bearing according to the present invention is especially adapted for such applications in which the bearing is subjected to relatively high axial compression forces and relatively small axial tension forces, as well as relatively small radial forces. Such bearings are for instance needed in cranes or in similar apparatus in which the bearing is used to turnably support an upright subjected to transverse forces at a portion thereof spaced from the bearing supported portion.

Double row anti-friction bearings for taking up radial and axial thrusts are known in which the rolling elements of two superimposed groups of rolling elements are constituted by balls. Multiple row anti-friction bearings are also known in which the rolling elements are constituted by rollers which are arranged in three superimposed groups and in which rollers of two groups have axes extending substantially normal to the axis of the bearing, whereas the rollers of the third group have axes extending in direction parallel to the bearing axis.

It is an object of the present invention to provide a double row anti-friction bearing which is improved over double row or multiple row anti-friction bearings known in the art.

It is a further object of the present inveniton to provide a double row anti-firction bearing which is adapted to take up greater axial compression forces than double row anti-friction bearings of the same size known in the art.

It is an additional object of the present invention to provide for a double row anti-friction bearing which will maintain its accuracy during extended use.

Finally, it is also an object of the present invention to provide an anti-friction bearing which consists of only a few and simple parts so that the bearing can be manufactured at a very reasonable cost.

With these objects in view, the double row anti-friction bearing for taking up radial and axial thrusts according to the present invention mainly comprises inner race means and outer race means defining between themselves a pair of superimposed races, and two groups of rolling elements respectively located in the aforementioned races, wherein the rolling elements of at least one group of elements is constituted by rollers.

In a preferred form of the anti-friction bearing according to the present invention, both groups of rolling elements are constituted by rollers and the rollers of one group have axes substantially normal to the bearing axis whereas the rollers of the other group have alternatingly axes substantially normal and axes substantially parallel to the bearing axis.

Due to the fact that the rollers engage the respective races with a line contact it is possible to subject the bearing according to the present invention to greater forces than can be used in anti-friction bearing using balls as rolling elements and due to the line contact there will also be a smaller elastic deformation between rollers and races so that the running exactness of the bearing will be improved. Furthermore, especially if only rollers are used as the rolling elements of the bearing, the bearing construction is greatly simplified in that the faces engaged by the rolling elements are either plain annular faces or cylindrical surfaces which can be very easily machined.

In the arrangement in which one group of rolling elements is constituted by rollers having alternatingly axes normal and axes parallel to the axis of the bearing, the overall height of the bearing as compared with a roller bearing having three superimposed groups of rolling elements is also greatly reduced.

Figure 2:
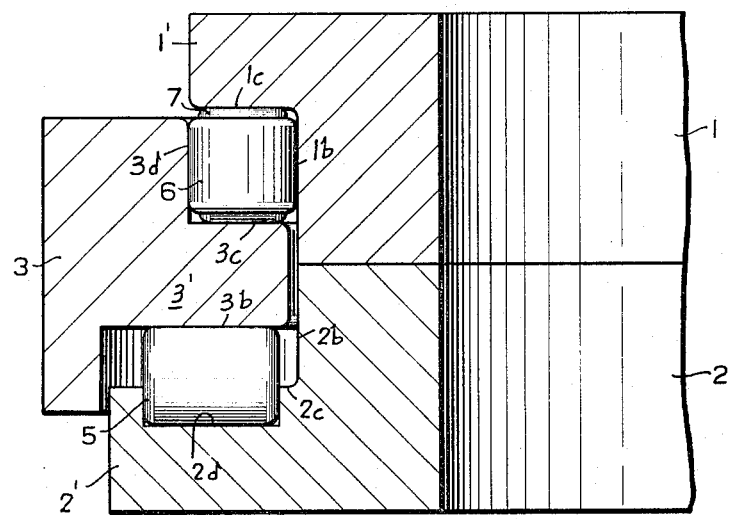

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partial, axial cross section through one embodiment of an anti-friction bearing according to the present invention in which one group of rolling elements is constituted by balls and the other group of rolling elements is constituted by rollers; and FIG. 2 is a partial, axial cross section through another embodiment according to the present invention in which both groups of rolling elements are constituted by rollers and in which one group of rollers has axes normal to the bearing axis, whereas the other group of rollers has alternatingly axes normal and axes parallel to the bearing axis.

Referring now to the drawings, and more specifically to FIG. 1 of the same, it will be seen that the double row anti-friction bearing according to the present invention comprises a pair of inner substantially L-shaped race members 1 and 2 having respectively end faces 1a and 2a abutting against each other and having each at the ends thereof opposite the aforementioned end faces a radially outwardly extending flange portion respectively designated with 1′ and 2′. The inner race member 1 has a cylindrical surface 1b coaxial with the axis of the bearing and, spaced from the end face 1a, an annular face 1c extending radially outwardly from the cylindrical surface 1b substantially normal to the bearing axis. The annular face 1c joins the cylindrical surface 1b along a spherical surface of revolution 1d. The inner race member 2 has likewise a cylindrical surface 2b coaxial with the bearing axis and an annular face 2c normal to the bearing axis. The inner race member 2 is further formed in the annular flange portion 2′ thereof with an annular groove 2d extending from the annular face 2c thereof into the inner race member 2. The embodiment shown in FIG. 1 includes further an outer substantially L-shaped race member 3 having an annular portion 3′ located between and spaced from the annular faces 1c and 2c of the inner race members. The annular portion has diametrically opposite the spherical surface of revolution 1d of the inner race member 1 a complementary spherical surface of revolution 3a defining with the spherical surface of revolution 1d a first race, and the annular portion 3′ has opposite the groove 2d an annular face 3b substantially normal to the bearing axis which defines with the groove a second race. A group of balls 4 is located in the aforementioned first race, whereas a group of rollers having axes substantially normal to the bearing axis are located in the aforementioned second race. The two inner race members 1 and 2 are held in abutting relationship by any means known in the art, not shown in the drawing. For instance, the inner race members 1 and 2 may be held together by screws, not illustrated in the drawing, or snap rings engaging the outer end faces of the two race members and respectively held in grooves of a shaft supported by the bearing may also be used for holding the end faces 1a and 2a of the two race members in abutting relationship.

The embodiment shown in FIG. 2 is very similar to the embodiment shown in FIG. 1, however, in the latter embodiment the group of balls 4 shown in the embodiment of FIG. 1 is replaced by a group of rollers 6 and 7 which alternate with each other and in which the roller 6 have respectively axes parallel to the bearing axis, whereas the roller 7 have respectively axes normal to the bearing axis. Accordingly, the annular portion 3' of the outer race member 3 shown in the embodiment of FIG. 2 has an annular face 3c arranged opposite and parallel to the annular face 1c of the inner bearing member 1, whereas a cylindrical surface 3d is provided on the outer race member 3 spaced from and parallel to the cylindrical surface 1b of the inner race member 1. The cylindrical surfaces of the rollers 7 engage the annular faces 1c and 3c of the inner race member 1 and the outer race member 3, respectively, whereas the cylindrical surfaces of the rollers 6 engage the cylindrical surfaces 1b and 3d of the inner race member 1 and the outer race member 3, respectively. In this arrangement the rollers 5 and 7 will take up axial forces, whereas the roller 6 will take up radial forces and this bearing is especially adapted for applications in which the bearing is subjected to great axial compression forces.

It will be understood that each of the elements described above, or two or more together, may also find a useful application in other types of double row anti-friction bearings differing from the types described above.

While the invention has been illustrated and described as embodied in a double row anti-friction bearing in which at least one group of rolling elements is constituted by rollers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A double row anti-friction bearing for taking up radial and axial thrusts comprising, in combination, inner and outer race means defining between themselves a pair of races spaced from each other in axial direction, one of said races having cylindrical surface portions coaxial with said bearing and annular plane surface portions normal to the axis of said bearing and the other of said races having plane annular surface portions normal to said axis; and two groups of rolling elements respectively located in said races, said rolling elements being constructed and engaging said surface portions so that the one group of rolling elements located in said one of said races will take up radial and axial thrusts and the other group of rolling elements located in said one of said races will take up only axial thrusts imparted to said bearing.

2. A double row anti-friction bearing as set forth in claim 1, wherein at least said other group of rolling elements is constituted by rollers.

3. A double row anti-friction bearing as set forth in claim 1, wherein said other group of rolling elements is constituted by rollers having axes substantially normal to the axis of the bearing.

4. A double row anti-friction bearing as set forth in claim 3, wherein said one group of rolling elements is constituted by rollers having alternatingly axes substantially normal and axes substantially parallel to the bearing axis.

5. A double row anti-friction bearing as set forth in claim 4, wherein said inner race means comprises a pair of inner substantially L-shaped race members having respectively end faces abutting against each other, each of said inner race members having a cylindrical surface coaxial with the axis of the bearing, and spaced from said end face an annular face extending radially outwardly from said cylindrical surface substantially normal to the bearing axis, the annular face of one of said inner race members being formed with an annular groove coaxial with said bearing axis, and wherein said outer race means comprises an outer substantially L-shaped race member having an annular portion located between and spaced from said annular faces of said inner race members, said outer race member having a cylindrical surface opposite the cylindrical surface of the other inner race member and said outer race member having an annular face parallel and opposite said annular face of said other inner face member, said one of said races being defined by said opposite faces, and said annular portion having opposite said groove an annular face substantially normal to said bearing axes and defining with said groove said other of said races.

References Cited by the Examiner

UNITED STATES PATENTS

| 2,643,920 | 6/1953 | Olszewski | 308—231 |
| 3,075,614 | 1/1963 | Grundon | 308—221 |

FOREIGN PATENTS

| 973,265 | 9/1950 | France. |
| 540,508 | 4/1952 | Italy. |
| 582,470 | 9/1958 | Italy. |

MARTIN P. SCHWADRON, *Primary Examiner.*

FRAND SUSKO, *Examiner.*